United States Patent [19]
Krish, Jr.

[11] Patent Number: 5,887,540
[45] Date of Patent: Mar. 30, 1999

[54] HINGED STAIRWAY SYSTEM FOR WATER VEHICLES

[76] Inventor: Ted Krish, Jr., 812 W. Magnolia Ave., Louisville, Ky. 40208

[21] Appl. No.: 993,366

[22] Filed: Dec. 18, 1997

[51] Int. Cl.⁶ .................................................. B63B 17/00
[52] U.S. Cl. ............................................................ 114/362
[58] Field of Search ................................... 114/343, 362; 182/82, 90, 91, 127, 89, 92, 93, 97

[56] References Cited

U.S. PATENT DOCUMENTS

4,057,125  11/1977  Kroft .......................................... 182/91
5,113,782   5/1992  McCarty .................................. 114/362

*Primary Examiner*—Ed L. Swinehart
*Attorney, Agent, or Firm*—Scott R. Cox

[57] ABSTRACT

A hinged stairway system for water vehicles containing a stairway for use in the water, a hinge secured to the stairway, a hinge angle or spacer bar secured to the hinge, a slotted snag-free adapter securable to the water vehicle into which the hinge angle or spacer bar fits. The hinged stairway system also contains a spring lock system secured to the slotted adapter and the hinge bar. The hinged stairway system may also contain a chair lift system secured to the stairway to permit a chair to be raised and lowered mechanically on the stairway.

17 Claims, 10 Drawing Sheets

HINGED STAIRWAY SYSTEM FOR WATER VEHICLES

BACKGROUND OF INVENTION

This invention relates to an attachment to water vehicles; more particularly a hinged, detachable stairway for attachment to the side, back, or bow of a water vehicle.

Many current boat ladders are difficult to use by individuals attempting to enter or leave the water. Sometimes this task is made even more difficult if the individual utilizing these ladders is an older individual or is carrying heavy, oversized equipment. For example, it is often difficult for individuals with diving equipment to climb over a boat's edge.

A variety of platform and ladder systems have been developed and marketed for attachment to the transoms of water vehicles or to the top or side edge of boats, such as pontoon boats, to assist in boarding or debarking the water vehicle.

These boat ladder systems are generally divided into two categories: (1) those that are permanently attached to the side of a water vehicle, or (2) those that are detachable from the side of a water vehicle for storage and use. This invention is directed towards this second type of detachable boat ladder system.

A number of different types of boat ladders have been designed for attachment to the transoms or rear of a water vehicle or for hooking over the edge of a boat or other type of water vehicle. For example, Des. 243,854 discloses boat steps which are attached to the transom of the boat apparently by the use of a pair of slot members which fit into a pair of sleeves secured to the transom of the boat. Another boat ladder, which utilizes a back plate (18) which fits within three brackets (16), which are themselves secured to the side or transom of a boat, is described in U.S. Pat. No. 3,794,140.

Boat ladders which are secured or attached to a boat, are often rotated about a hinge for easy removal from the water when not in use. Such an arrangement is disclosed, for example, in U.S. Pat. Nos. 4,724,925, 4,501,507, 4,462,485, 5,537,949, and 4,765,438.

These boat ladder systems are designed generally for attachment to the transom of a wooden, metal, or fiberglass water vessel. Boat ladder systems specifically designed for use with a pontoon boat are also important. Attachment of a boat ladder system to pontoon boats creates special problems because of the construction of the pontoon boats as they do not contain the same types of gunwale sections for attachment of the boat ladder system. Thus, it is more difficult to secure conventional boat ladder systems to a pontoon boat, especially systems designed to provide an angle of departure to ease access to the deck area.

In addition, current boat ladder systems for attachment to water vehicles are frequently difficult to attach to the sides of a water vehicle. Further, when these boat ladder systems are being used, there is a danger in pinching of the hands of an individual who is using the boat ladder system.

Further, because water vehicles are constantly in motion in the water, it is important that its boat ladder system be securely attached to the side of the water vehicle while in an upright position or in use. It is also important that these boat ladder systems be easily removable for storage on the water vehicle.

Accordingly, it is an aspect of this invention to disclose a hinged stairway system for use with water vehicles.

It is a still further aspect of this invention to disclose a hinged stairway system specifically designed for use with a pontoon boat, swim platform, or any related marine use.

It is a still further aspect of the invention to disclose a hinged stairway system containing a bumper to prevent damaging interaction between the stairway system and the side of the water vehicle and which eliminates any pinch point for the individual using the stairway system.

It is a still further aspect of the invention to disclose a spring locking system for securing the hinged stairway system in place against the side of the water vehicle either while in an upright position or when in use.

It is a still further aspect of the invention to disclose a mechanical chair lift system securable to a hinged stairway system for attachment to the side of a water vehicle.

It is a still further aspect of the invention to disclose a method for attachment of a hinged stairway system to the side, stern, or bow of a water vehicle which reduces the likelihood of pinching the fingers of an individual who is installing, removing, or using the hinged stairway system from the water vehicle.

These and other aspects of the invention can be obtained by the disclosed hinged stairway system for use with water vehicles.

SUMMARY OF INVENTION

The present invention is a hinged stairway system for use with water vehicles which contains a stairway platform and ladder rung for use in the water, a hinge secured to the stairway, a hinge bar securable to the hinge, and a slotted, snag-free adapter securable to the water vehicle into which the hinge bar fits. The hinged stairway system also preferably includes a bumper system secured to the stairway to prevent undesired contact between the hinged stairway system and the water vehicle and to eliminate any pinch point at the hinge. The present invention in a preferred embodiment further includes a spring lock system secured to the slotted, snag-free adapter and the hinge bar, wherein the spring lock system limits the movement of the stairway and secures the stairway in place against the side or end of the water vehicle while in use or stored in an upright position.

DETAILED DESCRIPTION OF THE PREFERRED EMBODIMENT

The present invention is a hinged stairway system (10) for water vehicles (20) comprising a stairway (12), a hinge (14) securable to the stairway (12), a hinge angle or spacer bar (16) securable to the hinge (14), and a slotted, snag-free adapter (18) securable to the water vehicle (20) into which one end of the hinge angle or spacer bar (16) fits. See FIGS. 1 through 4.

Figure 1:
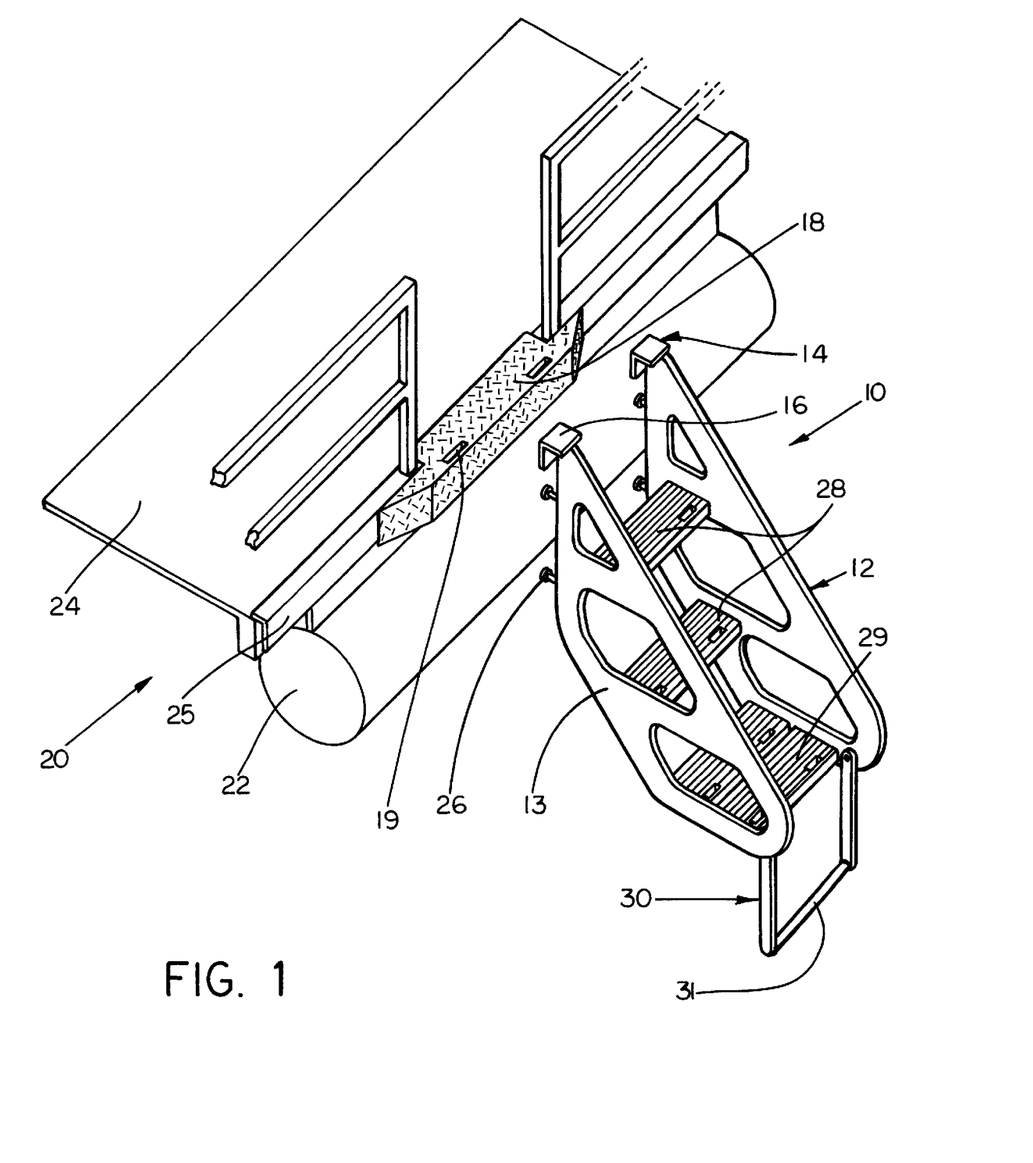
FIG. 1 is a side perspective view of the hinged stairway system to be installed against the side of a pontoon boat.
Figure 2:
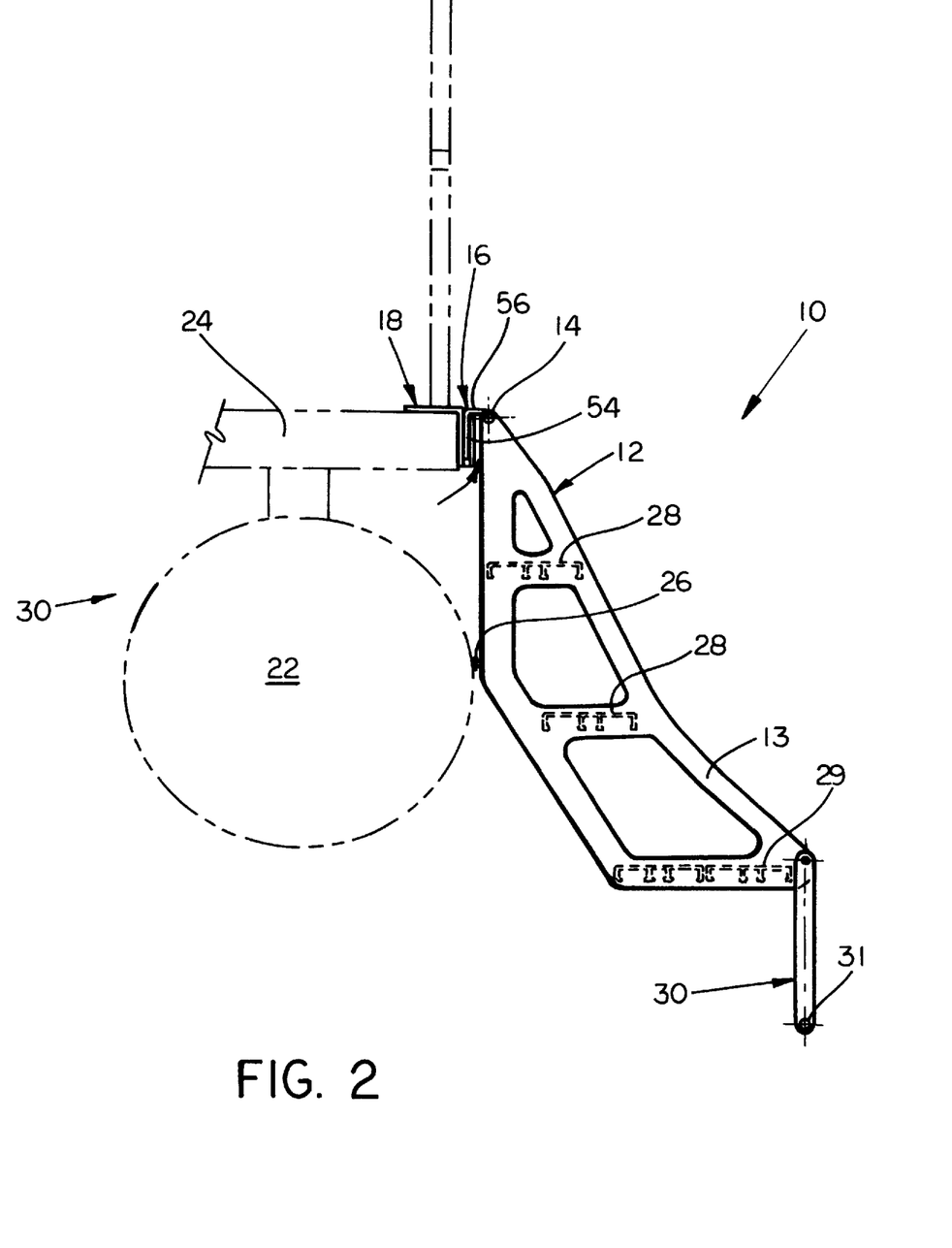
FIG. 2 is a side cutaway view of the first embodiment of the invention showing the hinged stairway system installed against a pontoon boat.
Figure 3:
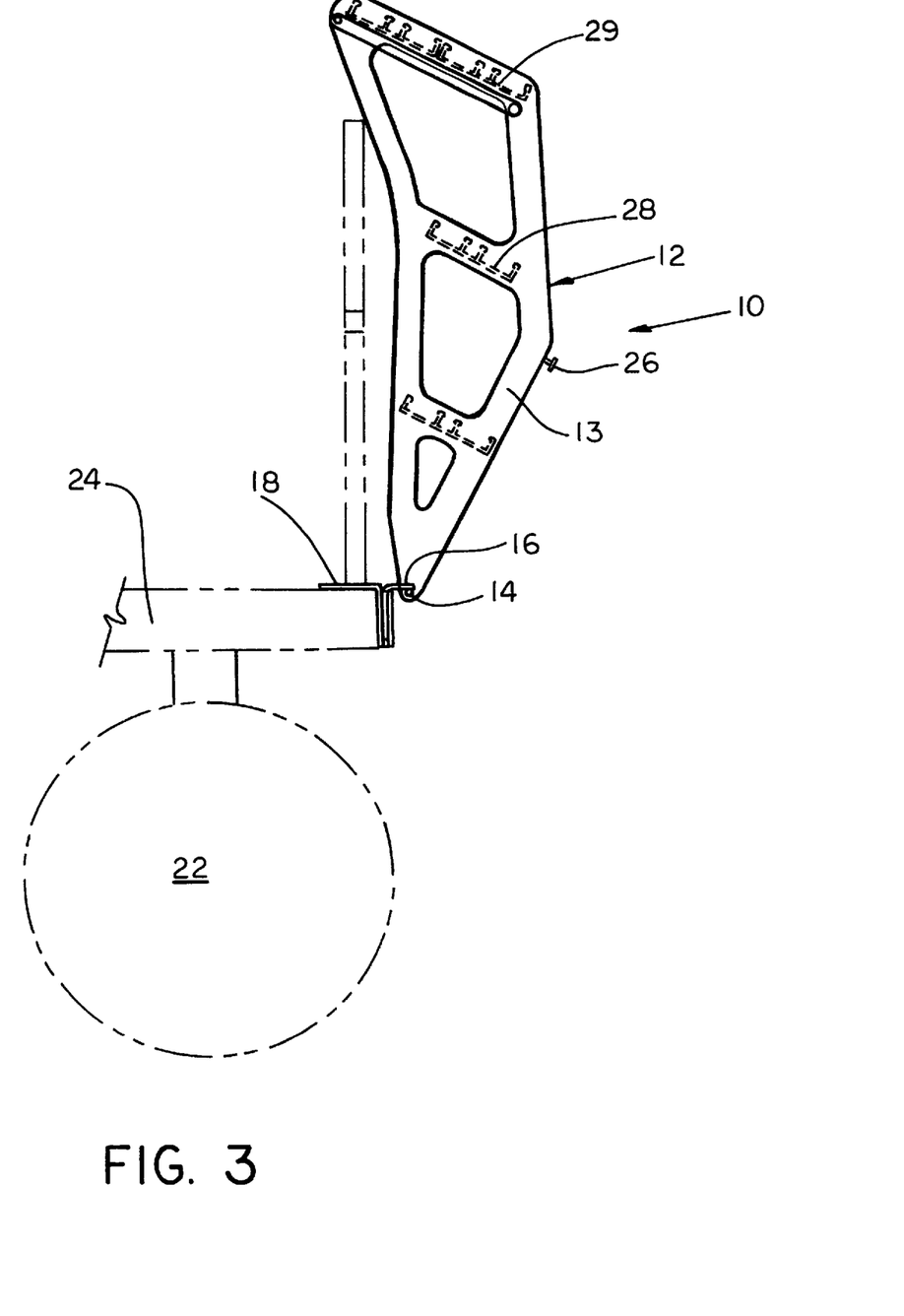
FIG. 3 is a side view of the hinged stairway system installed and raised from the water.

The hinged stairway system (10) may be attached to any type of water vehicle (20). However, in one preferred embodiment, it is specifically designed for use with pontoon boats. Pontoon boats generally contain two circular cross section pontoon elements (22) onto which is secured a frame (24). The hinged stairway system (10) of the present invention as shown in FIG. 1 is secured to a side (25) of that frame (24). One of the advantages of the present invention is the preferred use of a bumper system (26) secured to the hinged stair system (10) which will prevent the stairway (12) from hitting against the pontoon element (22) and also eliminate the pinch point at the hinge. To prevent damage from occurring, a bumper (26) is preferably secured against the inside surface of the stairway (12), as shown in FIG. 2. This bumper (26) can be any conventional bumper such as a screw partially inserted into the stairway (12). The head of the screw may be covered with a flexible bumper material, such as rubber or plastic.

Figure 4:
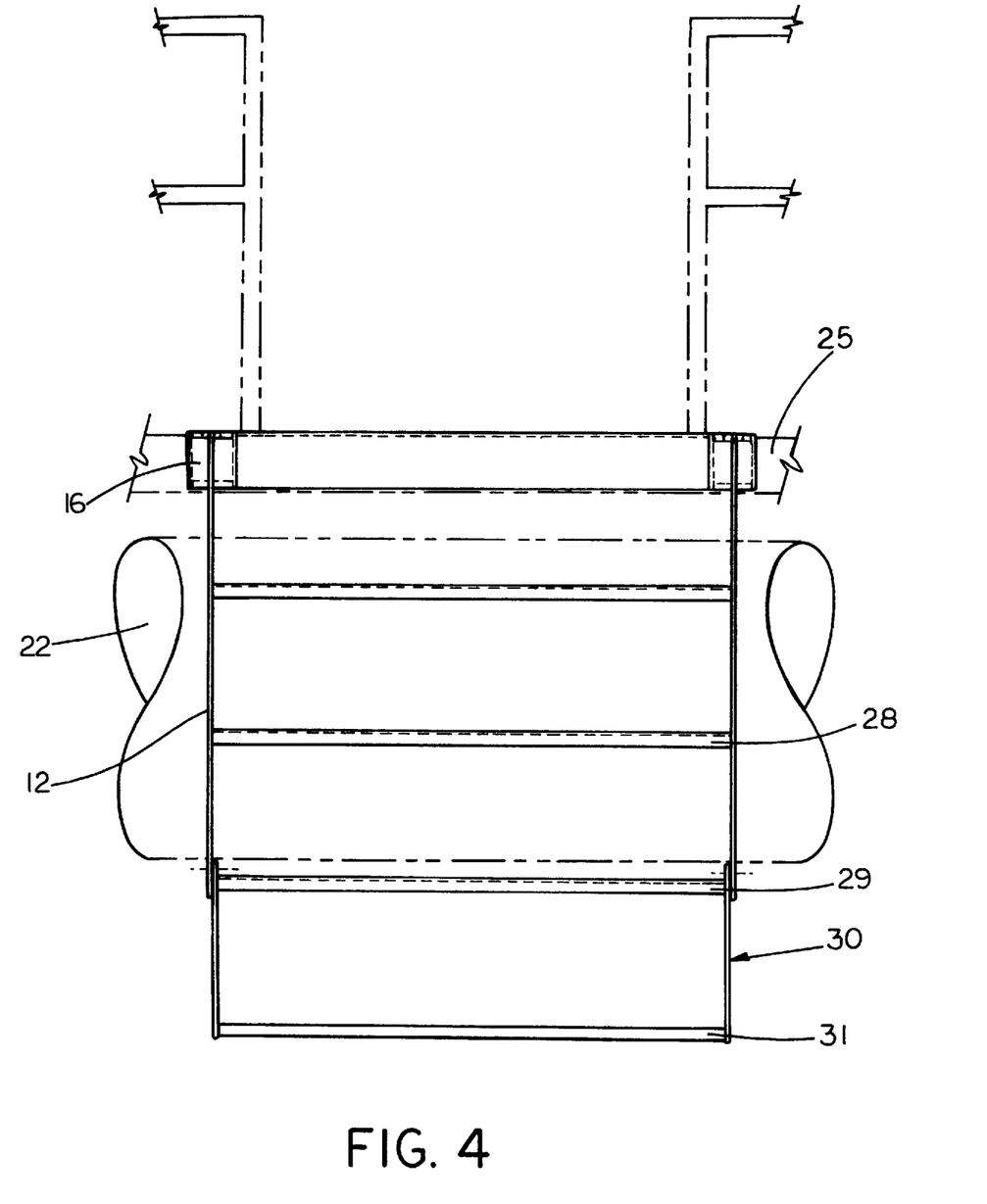
FIG. 4 is a front view of the hinged stairway system positioned in the water.

The stairway (12) of the hinged stairway system (10) is designed to assist those attempting to enter or exit the water from the pontoon boat. The stairway (12) contains a frame (13) to which steps are secured by conventional means. The stairway (12) is constructed of conventional material such as aluminum or plastic. The stairway (12) may have any number of individual steps, each with a step plank (28). In one preferred embodiment, two step planks (28) and a platform (29) are provided, as shown in FIG. 4. Preferably for ease of use, at least the bottom plank forms the platform (29) and is placed such that it is below the surface of the water when the hinged stairway system (10) is in use. The width of the individual step planks (28) is conventional, preferably from about 18 inches to about 3 feet in width, although other widths are certainly within the scope of the present invention. In one preferred embodiment, there is attached to the bottom step plate (29) of the stairway (12) a swivel ladder (30). This swivel ladder (30) includes a bar (31) with side supports extending downward from the stairway (12) which swivels around its attachment mechanism to the stairway (12). This swivel ladder (30) permits easier access to the stairway (12) by a person coming out of the water. See FIGS. 1 and 2.

Attached to the top portion of the stairway is the attachment device used for attaching the stairway (12) to the side (25) of the water vehicle (20). The attachment device for attaching the stairway (12) to the water vehicle includes the hinge (14), hinge angle or spacer bar (16) and the slotted, snag-free adapter (18).

The hinge is a conventional hinge, fabricated from stainless steel round bar, and is secured to the top portion of the stairway (12) by conventional means such as by pins, or other attachment systems.

Secured to one side of this hinge (14) is the hinge angle or spacer bar (16). In a preferred embodiment, the hinge angle or spacer bar (16) is formed in the shape of an "L", with the leg portion (54) of the L-shaped element secured to the hinge (14) and the body portion (56) of the L-shaped element utilized for insertion into the slotted, snag-free adapter (18). See FIGS. 2 and 3. The L-shaped hinge angle or spacer bar (16) is preferably made of a sturdy material, such as stainless steel, and is usually about ¼ inch thick, with the leg portion (54) preferably at least about 3 inches in length, and the body portion (56) also at least about 3 inches in length. When the hinge (14) is secured near the end of the leg portion (54) and the hinge angle or spacer bar (16) is inserted into the slotted, snag-free adapter (18), a space (58) is created between the adapter (18) and the edge of the stairway (12) as shown in FIG. 2. By making this space (54) at least about 1 inch, it is less likely that an individual can pinch his fingers between the stairway (12) and the side (25) of the water vehicle (20) when installing, removing or using the hinged stairway system (10).

Figure 5:
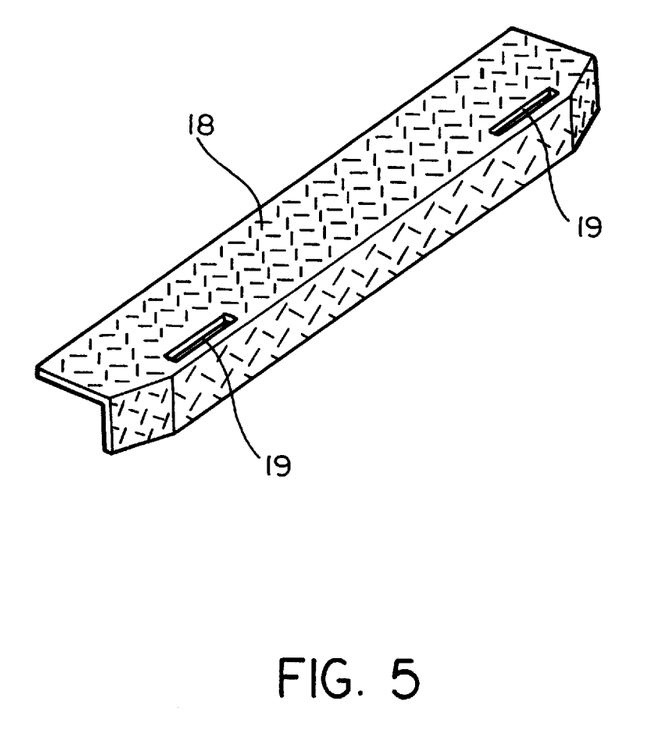
FIG. 5 is a side perspective view of the slotted, snag-free adapter.

The slotted, snag-free adapter (18) as shown in FIG. 5 is preferably an extended element at least about ⅜ inch in depth, and about 24 inches in width, depending on the width of the stairway of the water vehicle and is manufactured from a sturdy material, such as ⅛ inch thick aluminum. It is preferably secured to the side, stern, or bow (25) of a water vehicle (20), such as a pontoon boat, preferably at an opening provided in the handrail as shown in FIG. 1. It is secured to the side (25) of the water vehicle (20) by conventional means such as bolts or screws. On the outer surface of this slotted adapter (18) are a pair of slots (19) into which a portion of the hinge angle or spacer bar (16) is inserted. In one preferred embodiment, these slots (19) are of sufficient size to receive the body portion (56) of the L-shaped hinge angle or spacer bar (16). When the hinge angle or spacer bars (16) are properly inserted into the slots (19) of the adapter (18), the hinged stairway system (10) is held securely in place against the water vehicle (20).

Figure 6:
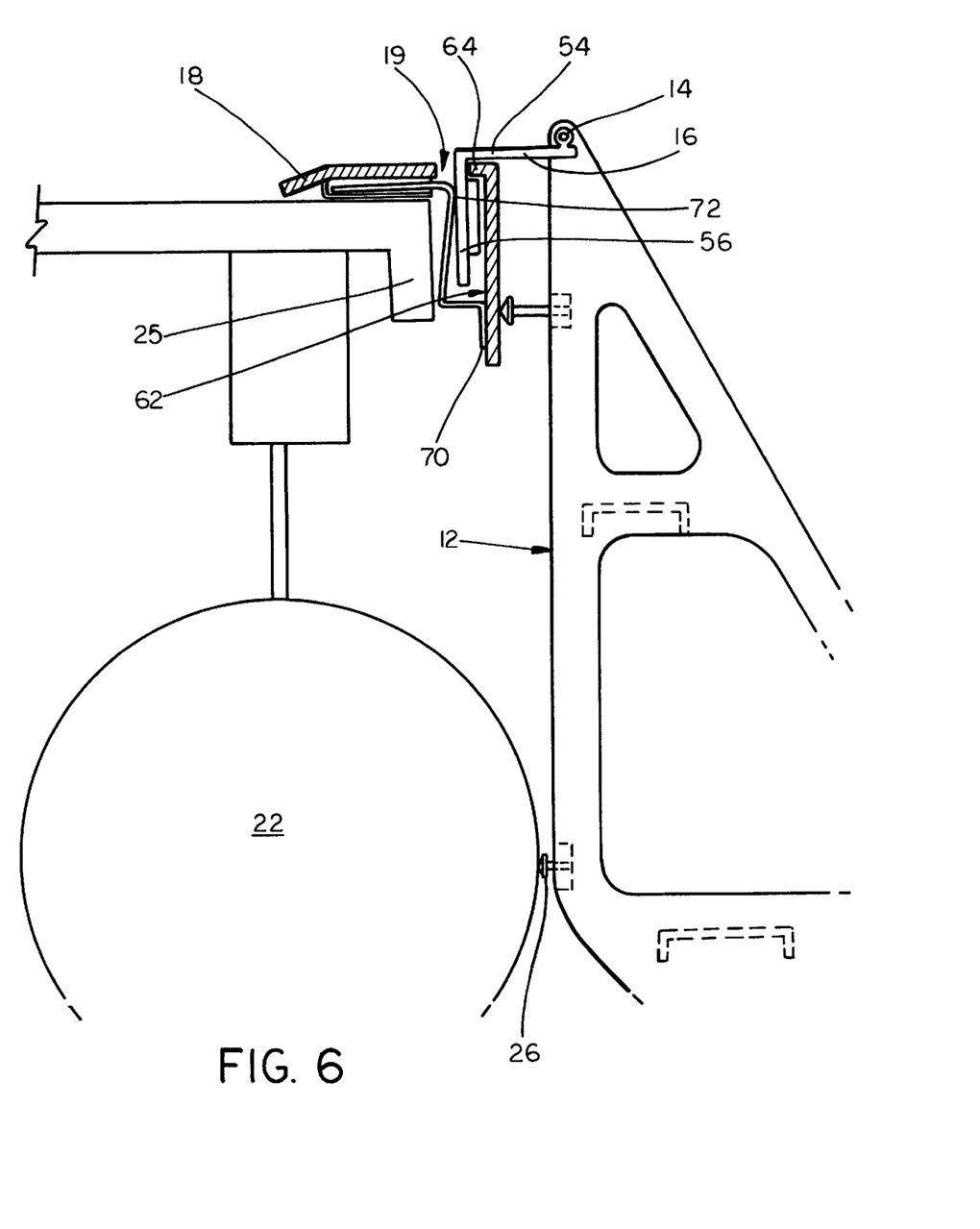
FIG. 6 is a side cutaway view of a second embodiment of the hinged stairway system showing a spring lock system securable within the slotted, snag-free adapter of the stairway system.
Figure 6A:
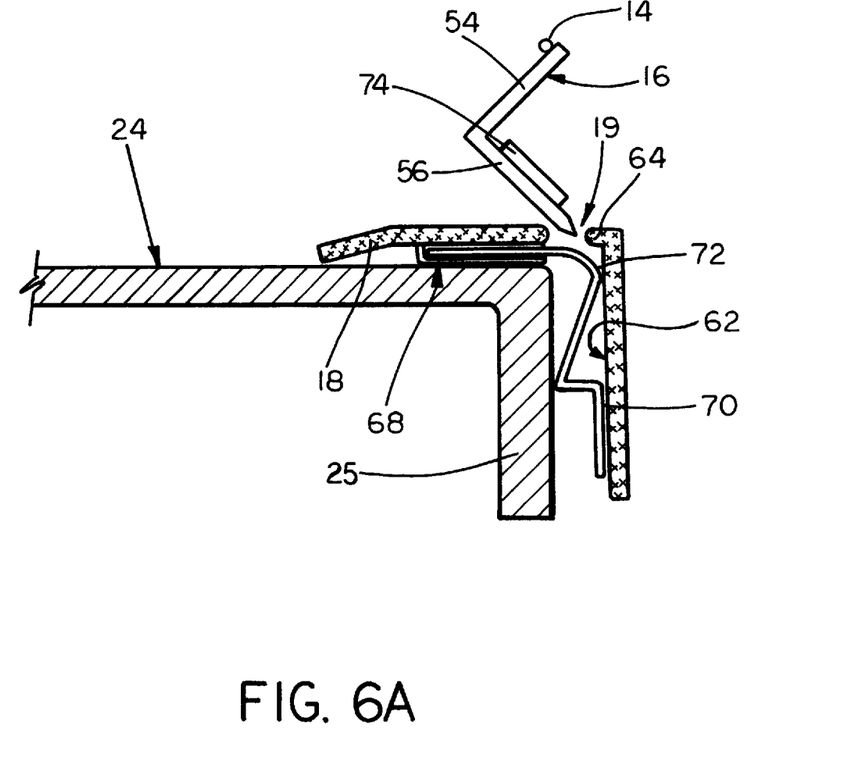
FIG. 6A is a side cutaway view of the second embodiment of the present invention of FIG. 6 showing the hinge and hinge bar ready for insertion into the slot of the slotted, snag-free adapter.

In a preferred embodiment, the hinge angle or spacer bar (16) and slotted adapter (18) use a spring lock (68), as shown in FIGS. 6 and 6A. The slots (19) are made larger in depth to receive the hinge bars (16). The outermost surface (62) of the slot (19) of the slotted adapter (18) has an extended edge or lip (64). This extended edge or lip (64) extends toward the opposite side of the slot (19) forming a lip as shown in FIGS. 6 and 6A. There is still maintained a sufficiently wide opening in the slot (19) of the slotted adapter (18) to permit the body portion (56) of the L-shaped hinge angle or spacer bar (16) to be inserted.

Introduced into the slot (19) of the slotted adapter (18) is the spring lock (68), such as is shown in FIGS. 6 and 6A. This spring lock (68) is formed with a generally "Z" shaped spring and is secured within the slot (19) by conventional securing means, such as rivets or weld. One end (70) of this Z-shaped spring lock (68) is secured firmly against the inside of the slot (19) of the slotted adapter (18) while the other end, the locking portion (72), is movable. This movable locking portion (72) locks the spring lock (68) into position. In its relaxed position, this locking portion (72) is extended toward the outermost surface (62) of the slot (19) as the body portion (56) of the L-shaped hinge angle or spacer bar (16) is inserted into the slot (19). This locking portion (72) of the spring lock (68) encourages the body portion (56) of the hinge angle or spacer bar (16) away from the inside of the adapter (18) toward the outermost surface (62) and eliminates the chance of fingers or toes being pinched.

Secured to the edge of the body portion (56) of the L-shaped hinge angle or spacer bar (16), is a lock plate (74).

This lock plate (74) is preferably made of the same material as the L-shaped hinge angle or spacer bar (16) and is at least about ⅛ inch thick. It is secured to the hinge angle or spacer bar (16) by conventional means, such as welding.

When the body portion (56) of the L-shaped hinge angle or spacer bar (16) is inserted into the slot (19), the lock plate (74) is encouraged toward the outermost surface (62) of the slot (19) of the slotted adapter (18) by the spring lock (68). When boat or wave motion provides the action to remove the stairway (12) from the slot (19) of the water vehicle (20), this lock plate (74) interacts with the extended edge or lip (64) of the slot (19) of the slotted adapter (18) to prevent removal. See FIG. 6. By this mechanism, the stairway is held securely in place. This spring lock (68) also prevents, or reduces significantly, movement and rocking of the stairway (12) while it is in use. In addition, it prevents unwanted removal of the stairway (12) by small children.

To remove the stairway (12) merely requires pressure to be placed on the stairway (12) directed toward the inside of the water vehicle (20). The stairway (12) is then pulled upward. Removal is made easier when the stairway (12) has been rotated around the hinge (14) to a vertical position. When this occurs, the natural force created by this movement will encourage the lock plate (74) away from the extended edge or lip (64) of the slotted adapter (18) for easy removal of the stairway (12).

Figure 7:
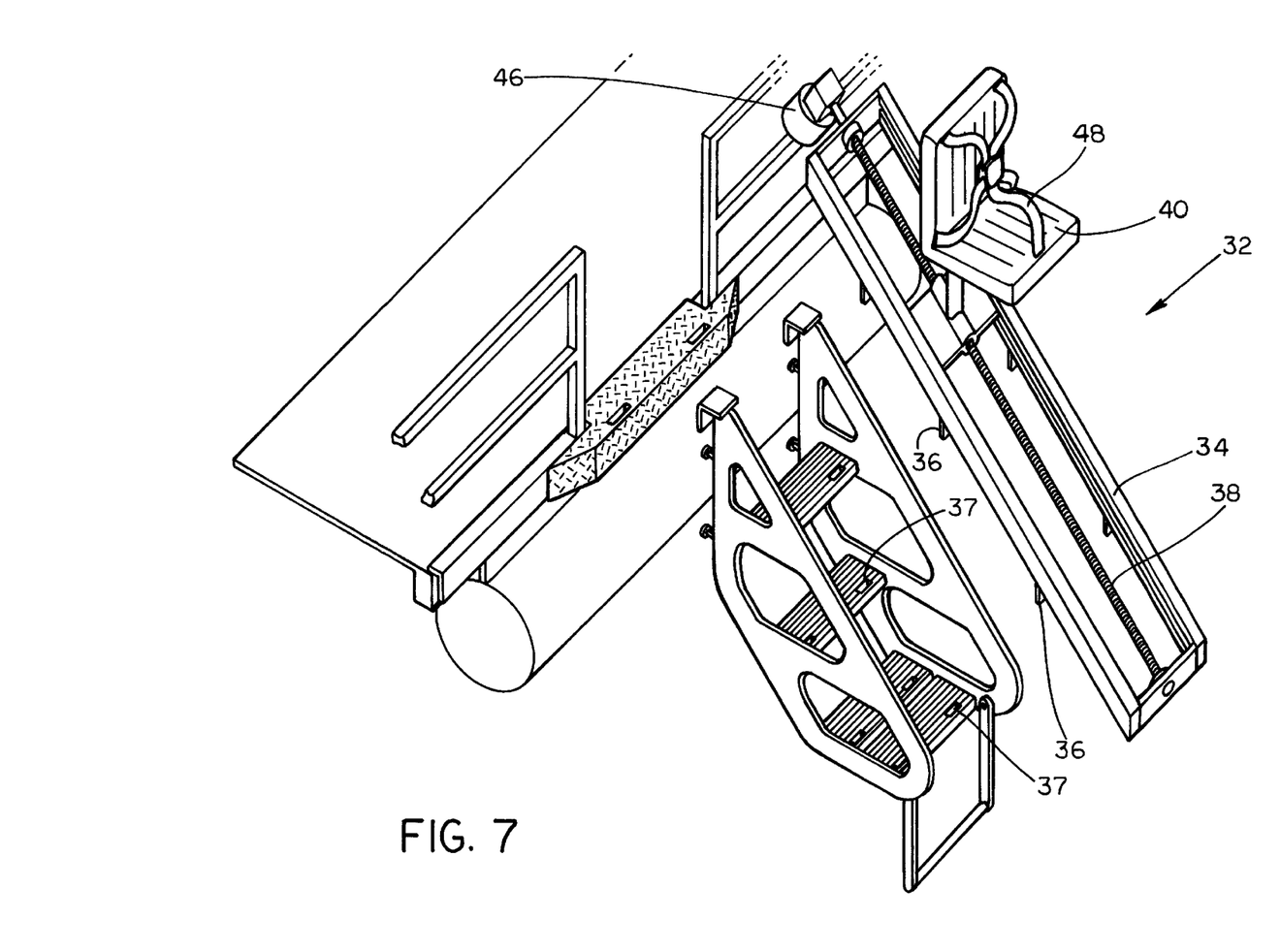
FIG. 7 is a perspective exploded view of the hinged stairway system showing a chair lift system to be installed on the stairway system.
Figure 8:
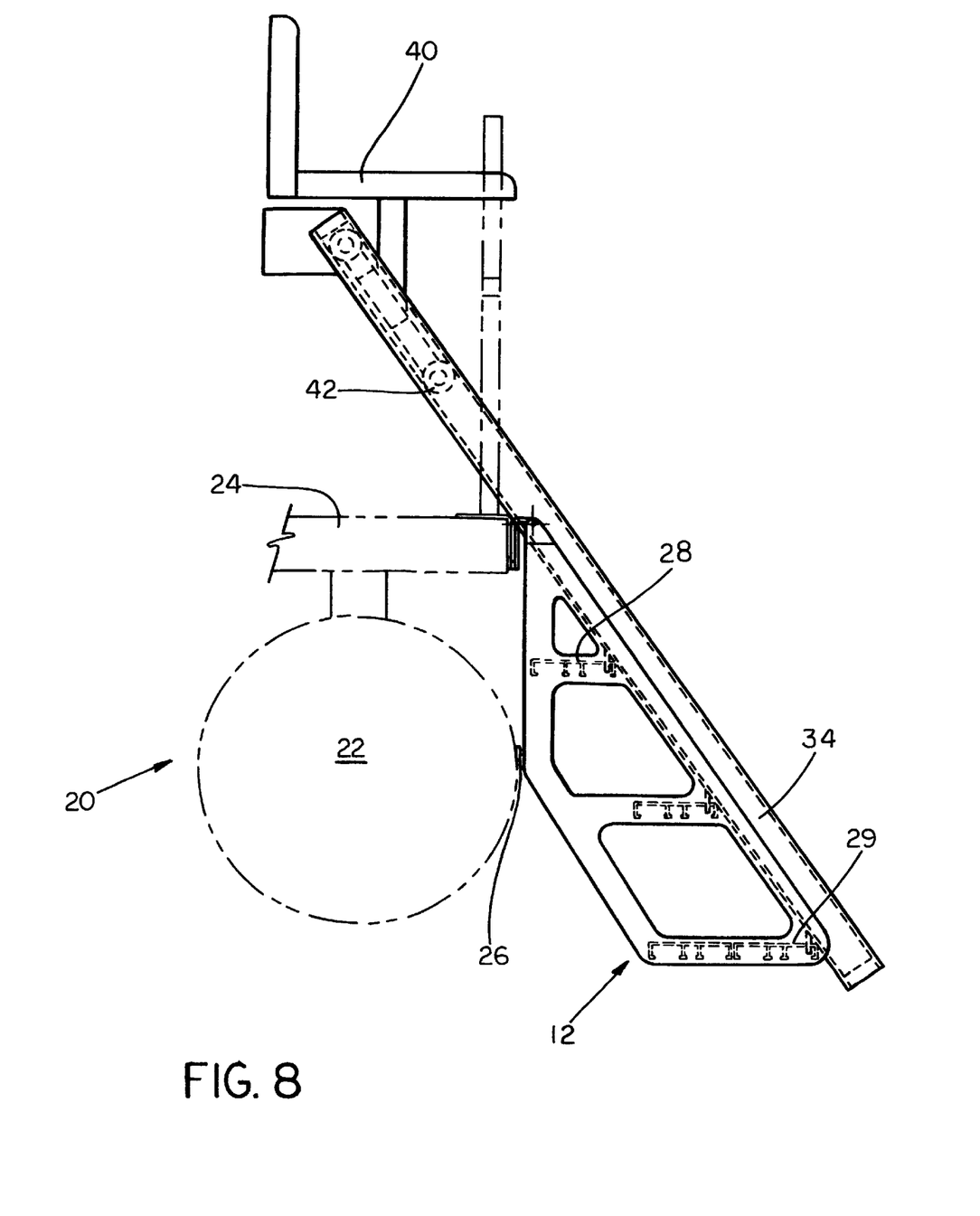
FIG. 8 is a side view of the hinged stairway system of FIG. 7 showing the chair lift system installed on the stairway.
Figure 9:
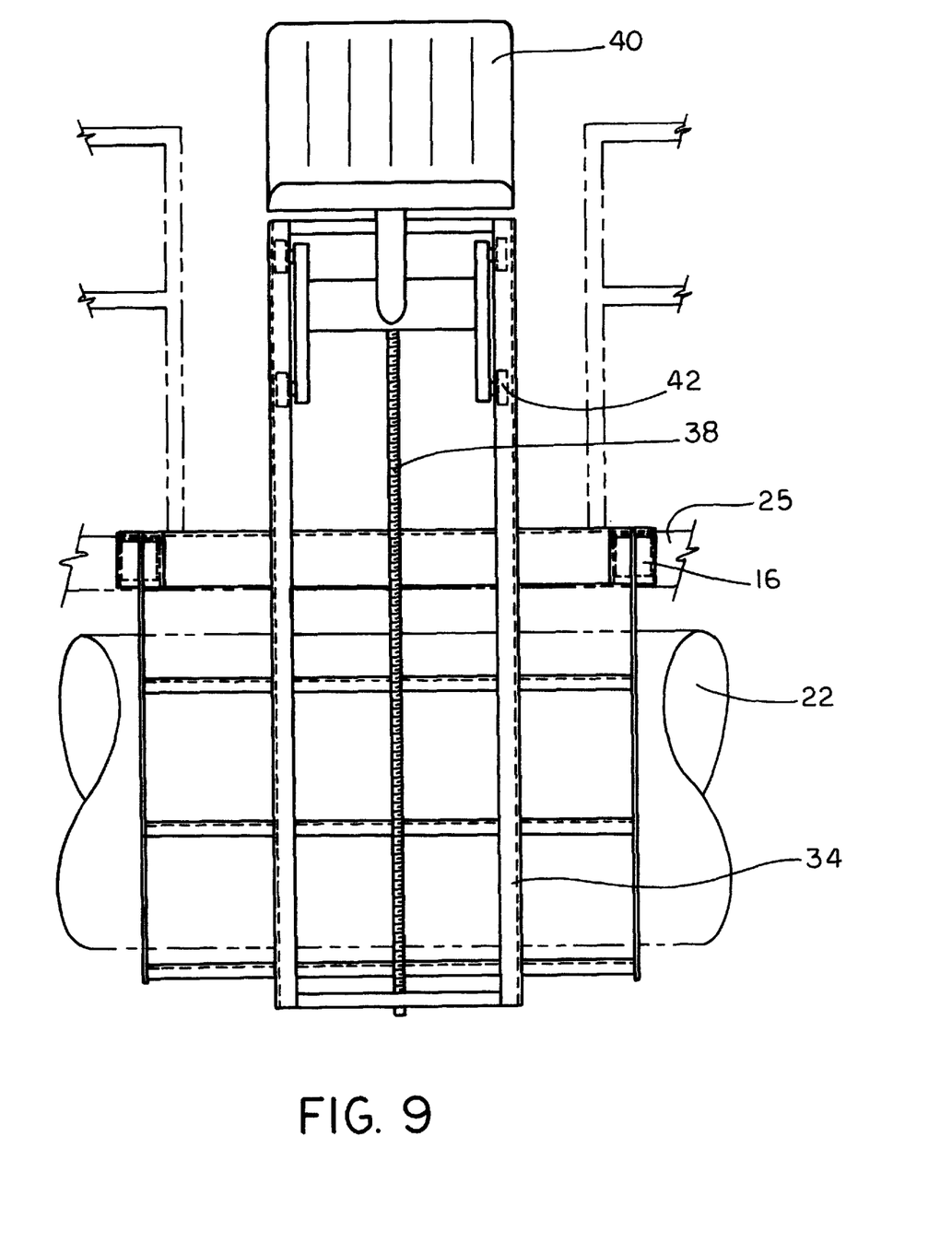
FIG. 9 is a front view of the hinged stairway system of FIG. 7 showing the chair lift system installed on the stairway.

The hinged stairway system (10) is also adaptable for use by individuals who have difficulty moving on the stairway (12) such as handicapped individuals. Thus, the hinged stairway system (10) can be adapted to receive a chair lift system (32), as shown in FIGS. 7, 8, and 9. Any conventional chair lift components can be utilized with the chair lift system (32). In one preferred embodiment, the chair lift system (32) is comprised of a support base (34) constructed of conventional sturdy materials containing a series of sleeves (36), a rotatable screw system (38) which moves a seat (40) up and down the support base (34), a series of axles and wheels (42) to support the seat (40) as it moves up and down the support base (34) and a DC or water pump motor (46) to rotate the screw system (38) so that the seat (40) can be moved up and down the support base (34). The seat (40) is of conventional aluminum construction, and is secured to the screw system (38) conventionally. The sleeves (36) are secured to the bottom of the chair lift system (32) and fit into slots (37) in the step plates (28) or platform (29), as shown in FIG. 7. In a preferred embodiment the seat (40) contains a seat belt system (48) used to secure an individual safely in the seat (40) and a flotation ring to provide additional support and security for that individual.

This system can also provide scuba diving options for physically challenged.

In operation, the slotted, snag-free adapter (18) is secured against the outside surface of the water vehicle (20), such as the frame (24) of a pontoon boat or swim platform, as shown in FIGS. 1, 2, 3, and 4. The hinge angle or spacer bar (16) of the hinged stairway system (10) are then introduced into slots (19) in the slotted adapter (18). The stairway (12) is then rotated around the hinge (14) until it is placed in the water at a convenient place for use by individuals within the water vehicle (20). After use, the stairway (12) is rotated on its hinges (14) and pulled upward to remove the hinge angle or spacer bar (16) from the slots (19) of the slotted adapter (18) for storage, or to secure the stairway in an upright position for storage outside the water vehicle interior.

In an alternative embodiment, as shown in FIGS. 6 and 6A, a spring lock system (60) forms a component of the hinged stairway system (10). In its operation, after the hinge angle or spacer bar (16) is introduced into the slots (19) of the slotted adapter (18), excess movement of the spring lock system (10) is reduced. When the stairway (12) is sought to be removed, it is rotated on its hinges (14), and pulled toward the inside of the water vehicle (20). This places the hinge angle or spacer bar (16) with lock plate (74) in a position for removal from the slot (19) of the slotted adapter (18). The stairway (12) is then pulled upward. The hinge angle or spacer bar (16) exits from the slotted adapter (18) and the stairway (12) can then be stored.

In an alternative embodiment, a chair lift system (32) may be utilized with the hinged stairway system (10). The sleeves (36) at the bottom of the support base (34) of the system (32) are placed within slots (37) in the step plates (28), as shown in FIG. 7, to hold the chair lift system (32) securely in place. The motor (46) is activated, which then moves the seat (40) up and down on the screw system (38). When the chair lift system (32) is to be stored, it is pulled up from the stairway (12) for storage.

It will be apparent from the foregoing that while particular forms of the invention have been illustrated and described, various modifications can be made without departing from the spirit and scope of the invention. Accordingly, it is not intended that the invention be limited.

I claim:

1. A hinged stairway system for water vehicles comprising
   a stairway for use in the water,
   a hinge secured to the stairway,
   a spacer bar secured to the hinge, and
   a slotted, snag-free adapter securable to the water vehicle into which the hinge bar fits.

2. The hinged stairway system of claim 1 further comprising a spring lock system secured within slots in the slotted adapter.

3. The hinged stairway system of claim 2 wherein the spring lock system further comprises a spring lock and a lock plate secured to the hinge bar.

4. The hinged stairway system of claim 3 wherein the spring lock is a generally Z-shaped piece secured within slots of the slotted adapter.

5. The hinged stairway system of claim 1 further comprising a bumper system secured to the stairway to prevent a pinch point and undesired contact between the stairway and the water vehicle.

6. The hinged stairway system of claim 1 further comprising a swivel ladder ring secured to the stairway.

7. The hinged stairway system of claim 1 further comprising a chair lift system secured to the stairway to permit a chair to be raised and lowered mechanically on the stairway.

8. The hinged stairway system of claim 1 wherein the spacer bar is generally L-shaped with a leg portion and a body portion, wherein the leg portion of the hinge bar is at least about 3 inches in length.

9. The hinged stairway system of claim 1 wherein a submerged platform is secured to the stairway.

10. A hinged stairway system for water vehicles comprising a stairway for use in the water,
    a hinge secured to the stairway,
    a hinge bar securable to the hinge,
    a slotted, snag-free adaptor securable to the water vehicle into which a portion of the hinge bar fits, and
    a spring lock system comprising a spring lock and a lock plate, wherein the lock plate is secured to the spacer bar.

11. The hinged stairway system of claim 10, wherein the spring lock is secured within slots in the slot adapter.

12. The hinged stairway system of claim 10 wherein the spring lock is a generally Z-shaped piece secured within the slots of the slot adapter.

13. The hinged stairway system of claim 10 further comprising a bumper system secured to the stairway to prevent undesired pinch points and contact between the stairway and the water vehicle.

14. The hinged stairway system of claim 10 further comprising a swivel ladder ring secured to the stairway.

15. The hinged stairway system of claim 10 further comprising a chair lift system secured to the stairway to permit a chair to be raised and lowered mechanically on the stairway.

16. The hinged stairway system of claim 10 wherein the spacer bar is generally L-shaped with a leg portion and a body portion, wherein the leg portion of the slotted piece is at least about 3 inches in length.

17. The hinged stairway system of claim 10 wherein a submerged platform is secured to the stairway.

* * * * *